United States Patent
Andrews et al.

(10) Patent No.: US 6,916,881 B2
(45) Date of Patent: *Jul. 12, 2005

(54) POLYESTER COMPOSITIONS OF LOW RESIDUAL ALDEHYDE CONTENT

(75) Inventors: Stephen Mark Andrews, New Fairfield, CT (US); James J. Usilton, Trumbull, CT (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 10/341,066

(22) Filed: Jan. 13, 2003

(65) Prior Publication Data

US 2003/0149177 A1 Aug. 7, 2003

Related U.S. Application Data

(63) Continuation of application No. 09/666,679, filed on Sep. 21, 2000, now abandoned.
(60) Provisional application No. 60/156,184, filed on Sep. 27, 1999.

(51) Int. Cl.$^7$ .............................................. C08L 67/02
(52) U.S. Cl. ........................................ 525/175; 525/166
(58) Field of Search ................................. 525/175, 166

(56) References Cited

U.S. PATENT DOCUMENTS

| | | | |
|---|---|---|---|
| 2,848,432 A | 8/1958 | Schulken, Jr. ............. 260/45.4 |
| 2,996,475 A | 8/1961 | Joyner et al. .............. 260/45.4 |
| 4,361,681 A | 11/1982 | Bernhardt ................... 525/444 |
| 4,837,115 A | 6/1989 | Igarashi et al. ........... 428/36.92 |
| 5,258,233 A | 11/1993 | Mills et al. ................. 428/480 |
| 5,266,413 A | 11/1993 | Mills et al. ................. 428/480 |
| 5,340,884 A | 8/1994 | Mills et al. ................. 125/420 |
| 5,459,224 A | 10/1995 | Pruett et al. ................ 528/192 |
| 5,648,032 A | 7/1997 | Nelson et al. .............. 264/101 |
| 5,650,469 A | 7/1997 | Long et al. ................. 525/425 |
| 5,856,385 A | 1/1999 | Mehrer et al. .............. 524/108 |
| 6,790,499 B2 * | 9/2004 | Andrews et al. ......... 428/36.92 |

FOREIGN PATENT DOCUMENTS

| | | |
|---|---|---|
| EP | 0826713 | 3/1998 |
| FR | 2372199 | 6/1978 |
| WO | 93/20147 | 10/1993 |
| WO | 93/23474 | 11/1993 |
| WO | 98/07786 | 2/1998 |
| WO | 98/39388 | 9/1998 |

OTHER PUBLICATIONS

Derwent Abstract 1978–38440A |22| for FR 2372199 (1978).

* cited by examiner

*Primary Examiner*—Jeffrey B. Roberston
(74) *Attorney, Agent, or Firm*—Tyler A. Stevenson

(57) ABSTRACT

A mixture of a polyester, such as poly(ethylene terephthalate) PET, and a second polymer which is polyacrylamide, polymethacrylamide or copolymer of acrylamide or methacrylamide when extrusion compounded exhibits a lower residual acetaldehyde content than does PET alone when similarly treated. The invention pertains to any polyester used in the manufacture of bottles or containers which in turn are used to store consumer materials, especially food, beverages and most especially water.

13 Claims, No Drawings

POLYESTER COMPOSITIONS OF LOW RESIDUAL ALDEHYDE CONTENT

This application is a continuation of application Ser. No. 09/666,679, filed Sep. 21, 2000, abandoned, which claims benefit under 35 USC 119(e) of U.S. Provisional Application No. 60/156,184, filed on Sep. 27, 1999.

A mixture of a polyester, such as poly(ethylene terephthalate) PET, and a second polymer which is polyacrylamide, polymethacrylamide or copolymer of acrylamide or methacrylamide when extrusion compounded exhibits a lower residual acetaldehyde content than does PET alone when similarly treated. The invention pertains to any polyester used in the manufacture of bottles or containers which in turn are used to store consumer materials, especially food, beverages and most especially water.

BACKGROUND OF THE INVENTION

U.S. Pat. No. 4,361,681 teaches that polyester containing anhydride end-cap agents have a reduced acetaldehyde generation rate.

U.S. Pat. No. 5,459,224 discloses polyesters having 4-oxybenzylidene end-cap agents to impart improved weatherability and photostability, but no mention is made as to evolution of acetaldehyde. However, it is indicated that such polyesters are suitable for food and beverage packaging.

Polyesters can be synthesized by a number of routes known in the art using a variety of catalyst systems. EP 826,713 A1 teaches that lower levels of acetaldehyde occur during copolymerization of PET when a phosphite such as bis(2,4-di-tert-butylphenyl)-pentaerythritol phosphite is present during the polymerization.

U.S. Pat. Nos. 4,837,115; 5,258,233; 5,266,413; 5,340,884; 5,648,032 and 5,650,469; and WO 93/20147 A1; WO 93/23474 A1; WO 98/07786 and WO 98/39388 teach the use of polyamides as a means of reducing the concentration of acetaldehyde, presumedly via a Schiff-base reaction with the aldehyde, which is reversible in the presence of water.

U.S. Pat. No. 5,856,385 teaches the use of polyamide or amide-wax to reduce the level of acetaldehyde which occurs when sorbitol-based clarifying agent is heated in polyolefins.

U.S. Pat. No. 5,011,890 describes the suppresion of formaldehyde formation when polyacrylamide, polymethacrylamide or selected acrylamide or methacrylamide copolymers are used in polyacetals. A requirement is that the polyacrylamide or polymethacrylamide must be "non-meltable" at the processing temperature of polyacetal. There is no suggestion in this patent that using polyacrylamide or polymethacrylamide in a polyester would reduce the concentration of acetaldehyde in a melt-mixed blend such as via extrusion.

The invention is useful for any polyester where aldehydic compounds, especially acetaldehyde, are formed or evolved during thermal processing of said polyester. Thermal processing of PET includes the synthesis of PET, thermal exposure during solid state polymerization (SSP), any injection molding, injection-blow molding or stretch-blow molding used in the manufacture of preforms, parissons or bottles and containers, or extrusion of film, or during any melt processing of PET above its glass transition temperature and below its decomposition temperature.

The instant invention provides for a lower amount of contaminants (e.g. aldehydes) in PET water bottles thus providing for improved taste or flavor in bottled water or other bottled beverages in said PET containers. The reduction in the amount of acetaldehyde is highly beneficial in this respect. Acetaldehyde is known as a decomposition product of polyesters such as PET. The acetaldehyde imparts an undesirable taste or flavor to bottled water stored in PET bottles. It has been a long sought objective of the industry to reduce the level of acetaldehyde which migrates out of the PET bottle walls into the water or other beverage stored therein. A number of engineering or design changes to extruders, injection molding machines for preforms and bottle making machinery have been made to minimize formation of acetaldehyde when poly(ethylene terephthalate) PET is processed Modification to the PET composition itself have been made to lower its melting point or its melt viscosity in order to allow less severe thermal or mechanical damage when PET is processed into preforms or bottles.

DETAILED DISCLOSURE

The instant invention pertains to a polyester composition, stabilized against the formation of aldehydic contaminants during melt processing of said polyester, which comprises (a) a polyester, and (b) an effective stabilizing amount of a second polymer which is a polyacrylamide, polymethacrylamide or an acrylamide or methacrylamide copolymer with at least one ethylenically unsubstituted comonomer.

The polyester of component (a) is 95–99.9% by weight of the stabilized composition; and the second polymer of component (b) is 5 to 0.1% by weight of the stabilized composition.

The polyester of component (a) has dicarboxylic acid repeat units selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

Preferably such diacids are terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, glutaric acid, adipic acid, sebacic acid and mixtures thereof.

Especially preferred are terephthalic acid and 2,6-naphthalene dicarboxylic acid.

The diol or glycol portion of the polyester of component (a) are derived from the generic formula HO—R—OH where R is an aliphatic, cycloaliphatic or aromatic moiety of 2 to 18 carbon atoms.

Preferably such diols or glycols are ethylene glycol, diethylene glycol, triethylene glycol, propane-1,3-diol, butane-1,4-diol, pentane-1,5-diol, hexane-1,6-diol, 1,4-cyclo-hexanedimethanol, 3-methylpentane-2,4-diol, 2-methylpentane1,4-diol, 2,2-diethyl-propane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl)propane, 2,2-bis-(4-hydroxypropoxyphenyl)ethane and mixtures thereof.

Most preferably, the diol is ethylene glycol.

The polyester of component (a) is preferably poly(ethylene terephthalate) PET or poly(ethylene 2,6-naphthalene-2,6-dicarboxylate); most preferably poly (ethylene terephthalate).

It is also contemplated that the polyester of component (a) can also be a blend of polyesters or copolyesters including components mentioned above.

It is contemplated that the polyester of component (a) can be virgin polymer or alternatively polymer recyclate. Additionally, it is possible to combine 80–99% by weight of a polyester with 20–1% by weight of a concentrate where the concentrate comprises 10–90% by weight of a polyester carrier resin and 90–10% by weight of a second polymer described for component (b).

The second polymer of component (b) is any polymer which contains a polymerized acrylamide or methacrylamide repeating unit. The preparation of acrylamide or methacrylamide polymers is generally known.

Preferably, the second polymer is polyacrylamide, polymethacrylamide, or a copolymer of acrylamide or methacrylamide with another ethylenically unsaturated monomer such as acrylamide, methacrylamide, styrene, ethylene, an alkyl acrylate, an alkyl methacrylate, 2-dimethylaminoethyl methacrylate, N-vinyl-2-pyrrolidinone or acrylonitrile.

Most preferably, the second polymer of component (b) is polyacrylamide (PERCOL® 333, Ciba) or polyacrylamide (PERCOL® 351, Ciba).

The copolymers of component (b) can be random or block copolymers.

It is also contemplated that the compositions may contain other components or modifiers such as stabilizers, dispersants, pigments, colorants, UV absorbers, antioxidants, toughening agents, nucleating agents and fillers as described in U.S. Pat. No. 5,011,890, the pertinent parts of which are incorporated herein by reference.

The instant invention also pertains to a process for preventing the formation of aldehydic contaminants during melt process of a polyester which comprises incorporating into said polyester an effective stabilizing amount of a second polymer which is polyacrylamide, polymethacrylamide or an acrylamide or methacrylamide copolymer with at least one ethylenically unsubstituted comonomer.

The instant invention also pertains to a process for forming a bottle preform or a PET bottle or container suitable for storing water (mineral, natural, ozonated) or other foodstuffs, which allows the desirable taste of the water or foodstuff after packaging to remain unaltered after being placed in said bottle or container prepared from the polyester composition of the instant invention.

The following examples are for illustrative purposes only and are not to be construed to limit the scope of the instant invention in any manner whatsoever.

General—PET bottle grade pellets are subjected to extrusion compounding to simulate the heat history which PET experiences when thermally injection molded into bottle preforms and subsequently stretch-blow molded into bottles. The efficacy of an additive added to reduce the formation of acetaldehyde is determined by quantitative analysis using thermal desorption GC-MS after adaption of published methods. An unstabilized PET is extruded each day to provide a control polymer for measuring acetaldehyde formation.

Extrusion—PET is predried in vacuo under nitrogen at an oven temperature of about 70° C. to a moisture level of about 30 ppm which is verified on a Mitsubishi VA-O6 moisturemeter. A Leistritz 18 mm or 27 mm corotating, non-intermeshing twin screw extruder is configured as follows: set temps=throat (220–230° C.), zones and die (270° C.), actual extrudate melt temperature is 275–280° C., screw at 100–110 rpm, hopper feeder=10–15 ppm.

PET Pellet Color—Yellowness Index (YI), and L*, a*, b* by ASTM D1925, D65 10 degm specular included, measured on PET pellets using a DCI spectrophotometer.

Acetaldehyde Analysis—The concentration of acetaldehyde in PET is quantitatively determined using a thermal desorption GC-MS method adapted from B. Nijassen et al., Packaging Technology and Science, 9, 175 (1996); S. Yong Lee, SPE ANTEC 1997, pp 857–861; and M. Dong et al., J. Chromatographic Science, 18, 242 (1980). A general example follows below:

The PET samples are analyzed, in duplicate, by weighing 250 mg of powdered PET pellets (cryogenically pulverized) in a 5 mL crimp sealed headspace vial. The sample vial is heated at 120° C. for one hour in a Tekmar model 5000 static headspace analyzer. The headspace gas (5 cc) is then transferred via a heated transfer line to a Fisons MD-800 GC-MS system for SIR detection of the acetaldehyde. The acetaldehyde is detected by monitoring its fragment ions of 29 and 44 m/e. The Total Ion Current (TIC) of the GC-MS is also monitored in the retention time region of 4–8 minutes. By doing this the presence of acetaldehyde in the samples is confirmed by three different detectors. By using a known acetaldehyde value for PET, the ration of peak areas for the known PET resin and for the experimental PET resin blends are compared and the amount of acetaldehyde in the experimental blend can be obtained.

EXAMPLE 1

Unstabilized commercial PET (CLEARTUF® 7207, Shell) is used as a control PET. The additive listed below demonstrates a significant reduction in the amount of acetaldehyde (AA) versus the amount seen when unstabilized PET is extrusion compounded. The total ion current (TIC) data run in triplicate for the control PET has a standard deviation of $\sigma = 0.35$.

| Sample* | Additive wgt % | % AA Reduction | TIC ave ppm AA |
| --- | --- | --- | --- |
| Control | none | — | 2.4 |
| A | 0.25 | 12 | 2.1 |

*A additive is polyacrylamide, PERCOL ® 333 (Ciba).

The use of the polyacrylamide results in the reduction of acetaldehyde versus the control.

EXAMPLE 2

Unstabilized commercial PET (CLEARTUF® 7207, Shell) is used as a control PET. The additive listed below demonstrates a significant reduction in the amount of acetaldehyde (AA) versus the amount seen when unstabilized PET is extrusion compounded. The total ion current (TIC) data run in triplicate for the control PET as a standard deviation of $\sigma = 0.35$.

| Sample* | Additive wgt % | % AA Reduction | TIC ave ppm AA |
| --- | --- | --- | --- |
| Control | none | — | 2.1 |
| B | 0.25 | 19 | 1.7 |

*B additive is polyacrylamide, PERCOL ® 351 (Ciba).

The use of the polyacrylamide results in the reduction of acetaldehyde versus the control.

EXAMPLE 3

When following the general procedure described in Example 1, the addition of the polyacrylamides as prepared in U.S. Pat. No. 5,011,890 to the PET before extrusion compounding results in reduced levels of acetaldehyde formation during extrusion compounding:

What is claimed is:

1. A process for preventing the formation of aldehydic contaminants during melt processing of a polyester, which polyester consists of a polyester selected from the group consisting of poly(ethylene terephthalate) and poly(ethylene 2,6-naphthalene-2,6-dicarboxylate)

which process comprises incorporating into said polyester an effective stabilizing amount of a second polymer which is polyacrylamide, polymethacrylamide or an acrylamide or methacrylamide copolymer with at least one ethylenically unsubstituted comonomer and melt processing the polyester.

2. A process according to claim 1 wherein the polyester is 95–99.9% by weight and the second polymer is 5 to 0.1% by weight, based on the total weight of the polyester and the second polymer.

3. A process according to claim 1 wherein the polyester is poly(ethylene terephthalate).

4. A process according to claim 1 wherein the polyester is poly(ethylene 2,6-naphthalene-2,6-dicarboxylate).

5. A process according to claim 1 wherein the second polymer is polyacrylamide, polymethacrylamide or a copolymer of acrylamide or methacrylamide with another ethylenically unsaturated monomer which is acrylamide, methacrylamide, styrene, ethylene, an alkyl acrylate, an alkyl methacrylate, 2-dimethylaminoethyl methacrylate, N-vinyl-2-pyrrolidinone or acrylonitrile.

6. A process according to claim 1 wherein the second polymer is polyacrylamide.

7. A process according to claim 1 for preparing polyester bottle preforms or polyester bottles.

8. A process according to claim 7 for preparing polyester bottle preforms or polyester bottles by injection molding, injection-blow molding or stretch-blow molding.

9. A process according to claim 7 wherein the polyester is 95–99.9% by weight and the second polymer is 5 to 0.1% by weight, based on the total weight of the polyester and the second polymer.

10. A process according to claim 7 wherein polyester is poly(ethylene terephthalate).

11. A process according to claim 7 wherein the polyester is poly(ethylene 2,6-naphthalene-2,6-dicarboxylate).

12. A process according to claim 7 wherein the second polymer is polyacrylamide, polymethacrylamide or a copolymer of acrylamide or methacrylamide with another ethylenically unsaturated monomer which is acrylamide, methacrylamide, styrene, ethylene, an alkyl acrylate, an alkyl methacrylate, 2-dimethylaminoethyl methacrylate, N-vinyl-2-pyrrolidinone or acrylonitrile.

13. A process according to claim 7 wherein the second polymer is polyacrylamide.

* * * * *